United States Patent
Byun et al.

(10) Patent No.: US 12,292,587 B2
(45) Date of Patent: May 6, 2025

(54) HIGH-DURABILITY COLORING METAL MEMBER AND METHOD OF PRODUCING THE SAME

(71) Applicant: Korea Institute of Science and Technology, Seoul (KR)

(72) Inventors: Ji Young Byun, Seoul (KR); Md Abdur Rahman, Seoul (KR); So Hye Cho, Seoul (KR); Seung Yong Lee, Seoul (KR); Hyungduk Ko, Seoul (KR); Sung Lim Choi, Seoul (KR); Dong Kyu Kim, Seoul (KR); Kwang-Deok Choi, Seoul (KR); Inuk Baek, Seoul (KR); Yun Hee Kim, Uijeongbu-si (KR)

(73) Assignee: Korea Institute of Science and Technology, Seoul (KR)

( * ) Notice: Subject to any disclaimer, the term of this patent is extended or adjusted under 35 U.S.C. 154(b) by 390 days.

(21) Appl. No.: 17/858,391

(22) Filed: Jul. 6, 2022

(65) Prior Publication Data
US 2023/0018835 A1      Jan. 19, 2023

(30) Foreign Application Priority Data
Jul. 6, 2021   (KR) .................. 10-2021-0088628

(51) Int. Cl.
  *G02B 5/28*   (2006.01)
(52) U.S. Cl.
  CPC .................... *G02B 5/28* (2013.01)
(58) Field of Classification Search
  None
  See application file for complete search history.

(56) References Cited

U.S. PATENT DOCUMENTS

| | | | |
|---|---|---|---|
| 6,605,848 B2 | 8/2003 | Ngo et al. | |
| 8,178,934 B2 | 5/2012 | Kitano et al. | |
| 8,440,520 B2 | 5/2013 | Clark | |
| 10,745,795 B2 | 8/2020 | Ramadas et al. | |
| 2003/0005859 A1* | 1/2003 | Andes .................. | C09C 1/0069 106/404 |
| 2004/0166308 A1* | 8/2004 | Raksha ................. | C09C 1/0024 428/329 |
| 2005/0037240 A1 | 2/2005 | Haoto et al. | |
| 2021/0017811 A1 | 1/2021 | Han | |

FOREIGN PATENT DOCUMENTS

| | | |
|---|---|---|
| JP | 2011-523977 A | 8/2011 |
| KR | 10-2004-0088375 A | 10/2004 |
| KR | 10-0891367 B1 | 4/2009 |
| KR | 10-1126650 B1 | 3/2012 |
| KR | 10-2019-0128917 A | 11/2019 |
| KR | 10-2020-0118703 A | 10/2020 |

OTHER PUBLICATIONS

Korean Office Action issued on Apr. 18, 2023, in counterpart Korean Patent Application No. 10-2021-0088628 (4 pages in Korean).

* cited by examiner

*Primary Examiner* — Robert E. Tallman
(74) *Attorney, Agent, or Firm* — NSIP Law

(57) ABSTRACT

Provided is a high-durability coloring metal member. The high-durability coloring metal member includes a metal substrate, a dielectric layer provided on the metal substrate, and an oxynitride compound layer provided on the dielectric layer. The metal member is capable of expressing vivid and various colors with a color protection layer applied on the surface of the metal member.

17 Claims, 5 Drawing Sheets

HIGH-DURABILITY COLORING METAL MEMBER AND METHOD OF PRODUCING THE SAME

CROSS-REFERENCE TO RELATED PATENT APPLICATION

This application claims the benefit of Korean Patent Application No. 10-2021-0088628, filed on Jul. 6, 2021, in the Korean Intellectual Property Office, the disclosure of which is incorporated herein in its entirety by reference.

BACKGROUND

1. Field

The present invention relates to a high-durability coloring metal member and a method of producing the same and, more particularly, to a metal member having a high durability and capable of expressing vivid and various colors by applying a color protection layer on the surface of the metal member, and a method of producing the same.

2. Description of the Related Art

Currently, the surface of a metal member is colored using a metal-insulator-metal (MIM) structure. The MIM structure is a structure in which a dielectric layer is coated on a metal substrate such as aluminum (Al), stainless steel, or copper (Cu), and a metal layer is coated on the dielectric layer to have a thickness less than or equal to several tens of nm, and may be used to express vivid and various colors on the surface of the metal member.

However, because interfacial adhesion force between the upper metal layer and the dielectric layer is not high, the upper metal layer may be easily removed to cause discoloration. In addition, when a common metal such as Cu is used for the upper metal layer to reduce a cost for coating, a problem of corrosion is not avoidable.

A low-reflectivity metal such as nickel (Ni), titanium (Ti), or stainless steel may be simply coated with only a dielectric layer to provide various colors based on a change in thickness thereof. However, in this case, vivid colors may not be provided due to low color saturation.

SUMMARY

The present invention provides a high-durability coloring metal member capable of solving problems of an upper metal layer, and a method of producing the same. However, the scope of the present invention is not limited thereto.

According to an aspect of the present invention, there is provided a high-durability coloring metal member.

The high-durability coloring metal member may include a metal substrate, a dielectric layer provided on the metal substrate, and an oxynitride compound layer provided on the dielectric layer.

As contents of nitrogen and oxygen contained in the oxynitride compound layer, a ratio of nitrogen to oxygen may be greater than 1.

The oxynitride compound layer may include $CrN_xO_{(1-x)}$, $TiN_xO_{(1-x)}$, $ZrN_xO_{(1-x)}$, $(Cr, Ti, Zr)N_xO_{(1-x)}$, or $(Ti, Al)N_xO_{(1-x)}$, where x may be greater than 0.5.

The oxynitride compound layer may have a thickness ranging from 5 nm to 100 nm.

The dielectric layer may include $SiO_2$, $Al_2O_3$, MgO, $TiO_2$, $WO_3$, indium tin oxide (ITO), $Si_3N_4$, or AlN.

The dielectric layer may have a thickness ranging from 30 nm to 400 nm.

The high-durability coloring metal member may further include an oxide layer provided on the oxynitride compound layer.

The oxide layer may include $SiO_2$ or $Al_2O_3$.

The oxide layer may have a thickness ranging from 400 nm to 15 μm.

According to another aspect of the present invention, there is provided a method of producing a high-durability coloring metal member.

The method may include forming a dielectric layer on a metal substrate, and forming an oxynitride compound layer on the dielectric layer.

The forming of the oxynitride compound layer may be performed using any one selected from among physical vapor deposition (PVD), chemical vapor deposition (CVD), and atomic layer deposition (ALD).

Contents of nitrogen and oxygen contained in the oxynitride compound layer may be represented as atomic fractions, and a ratio of nitrogen to oxygen may be greater than 1.

The oxynitride compound layer may include $CrN_xO_{(1-x)}$, $TiN_xO_{(1-x)}$, $ZrN_xO_{(1-x)}$, $(Cr, Ti, Zr)N_xO_{(1-x)}$, or $(Ti, Al)N_xO_{(1-x)}$, where x may be greater than 0.5.

The oxynitride compound layer may have a thickness ranging from 5 nm to 100 nm.

The dielectric layer may include $SiO_2$, $Al_2O_3$, MgO, $TiO_2$, $WO_3$, indium tin oxide (ITO), $Si_3N_4$, or AlN.

The dielectric layer may have a thickness ranging from 30 nm to 400 nm.

The method may further include forming an oxide layer on the oxynitride compound layer.

The oxide layer may include $SiO_2$ or $Al_2O_3$.

The oxide layer may have a thickness ranging from 400 nm to 15 μm.

BRIEF DESCRIPTION OF THE DRAWINGS

The above and other features and advantages of the present invention will become more apparent by describing in detail embodiments thereof with reference to the attached drawings in which.

DETAILED DESCRIPTION

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art.

A high-durability coloring metal member according to an embodiment of the present invention may have a high durability and express vivid and various colors by using a metal-insulator-metal (MIM) structure and applying an oxynitride compound layer instead of an upper metal layer.

Figure 1:
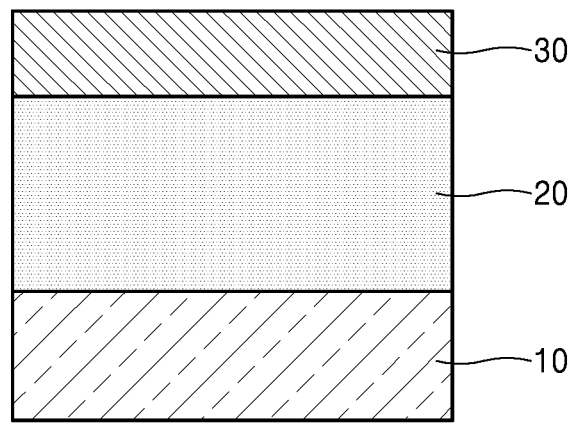
FIGS. 1 and 2 are cross-sectional views of high-durability coloring metal members according to embodiments of the present invention.
Figure 2:
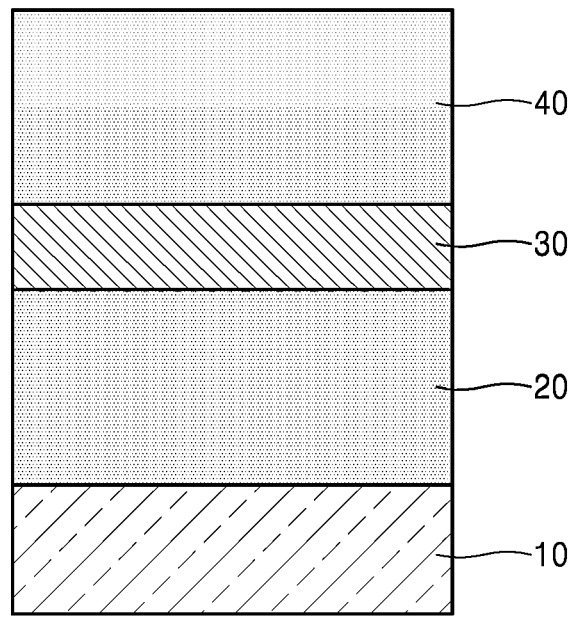

FIGS. 1 and 2 are cross-sectional views of high-durability coloring metal members 100 and 200 according to embodiments of the present invention.

Referring to FIG. 1, the high-durability coloring metal member 100 according to an embodiment of the present invention includes a structure in which a metal substrate 10, a dielectric layer 20, and an oxynitride compound layer 30 are sequentially stacked on one another. The metal substrate 10 may use any of metals such as aluminum (Al), stainless steel, and copper (Cu). Herein, the dielectric layer 20 and the oxynitride compound layer 30 may be formed using any one selected from among physical vapor deposition (PVD), chemical vapor deposition (CVD), atomic layer deposition (ALD), and a sol-gel method. The above-mentioned thin film coating methods are already known, and thus a detailed description thereof is not provided herein.

The dielectric layer 20 may include, for example, $SiO_2$, $Al_2O_3$, MgO, $TiO_2$, $WO_3$, indium tin oxide (ITO), $Si_3N_4$, or AlN, and have a thickness ranging from 30 nm to 400 nm. Because various colors may be expressed by changing the thickness of the dielectric layer 20, most of desired colors may be expressed when the thickness of the dielectric layer 20 is in the above-mentioned range. When the thickness of the dielectric layer 20 is less than 30 nm, color expression based on interference is not easily enabled. Although no problem in color expression is caused when the thickness of the dielectric layer 20 is greater than 400 nm, the thickness of the dielectric layer 20 may be controlled to be less than or equal to 400 nm in consideration of an economical aspect.

The oxynitride compound layer 30 exhibits optical properties like a mixture of a metal and a dielectric and thus may be used instead of an upper metal layer of a MIM structure. Oxynitride has a high hardness and a high interfacial adhesion to the dielectric layer 20, and thus has a high wear resistance. This means that partial loss of the oxynitride compound layer 30 is not easy and thus color stability is increased. The oxynitride compound layer 30 may include, for example, $CrN_xO_{(1-x)}$, $TiN_xO_{(1-x)}$, $ZrN_xO_{(1-x)}$, $(Cr, Ti, Zr)N_xO_{(1-x)}$, or $(Ti, Al)N_xO_{(1-x)}$, where x may be greater than 0.5.

For the durable coloring metal member 100 according to an embodiment of the present invention, a ratio of elements of the oxynitride compound layer 30 provided as a top layer is very critical. For example, contents of nitrogen and oxygen contained in the oxynitride compound layer 30 may be represented as atomic fractions, and a ratio of nitrogen to oxygen may be greater than 1. Herein, the above-mentioned ratio refers to an atomic ratio. That is, the content of nitrogen needs to be greater than the content of oxygen, and unique optical properties are exhibited when the above condition is satisfied.

When the ratio of nitrogen to oxygen in the oxynitride compound layer 30 is less than or equal to 1, that is, when x is less than or equal to 0.5, an extinction coefficient in a visible light band is very small and the oxynitride compound layer 30 acts like an oxide.

On the other hand, when x is greater than 0.5, the extinction coefficient gradually increases and, when x approaches 1, optically metallic properties are exhibited. When the optical properties are similar to those of a metal, the thickness of the upper layer may not be increased above 30 nm. For this reason, the range of x may be greater than 0.5 and less than or equal to 0.95.

However, when the content of nitrogen is greatly increased and the content of oxygen is greatly reduced to exhibit nitride properties, the oxynitride compound layer 30 has optical properties similar to those of a metal and thus needs to be carefully controlled in thickness when applied as the upper layer. For example, the thickness of CrN may not be easily increased above 20 nm.

The oxynitride compound layer 30 may have a thickness ranging from 5 nm to 100 nm. When the thickness of the oxynitride compound layer 30 is less than 5 nm, vivid colors may not be obtained and a suitable durability may not be easily obtained. On the other hand, when the thickness of the oxynitride compound layer 30 is greater than 100 nm, although the durability may be increased, a certain type of vivid colors, e.g., reddish colors, may not be easily obtained, and a long time and a high cost may be required for production. As such, the thickness of the oxynitride compound layer 30 may be controlled to be less than or equal to 100 nm in consideration of an economical aspect.

In general, when a metal is used for an upper layer, and when the upper metal layer has a large thickness greater than or equal to 30 nm, properties of the upper metal layer are dominantly exhibited to disable expression of vivid colors. On the other hand, when the oxynitride compound layer 30 is used, although the oxynitride compound layer 30 has a larger thickness greater than or equal to 50 nm, vivid colors may be expressed on the surface of the metal member 100. Furthermore, color changes may be enabled by changing the thickness of the oxynitride compound layer 30 in addition to the dielectric layer 20, and thus various colors may be printed.

Referring to FIG. 2, the metal member 200 includes a structure in which the metal substrate 10, the dielectric layer 20, the oxynitride compound layer 30, and an oxide layer 40 are sequentially stacked on one another. A detailed description of the components already described above is not provided below.

Although the metal member 200 may satisfy a sufficient durability with only the oxynitride compound layer 30, under an unfavorable condition of being exposed to an abnormal and harsh environment, the oxide layer 40 provided on the oxynitride compound layer 30 may be used as a protection layer to further increase the durability. When necessary, a separate organic material layer may be adopted in addition to the oxide layer 40 and a combination thereof may be used as a protection layer. Herein, the oxide layer 40 may include, for example, $SiO_2$ or $Al_2O_3$, and have a thickness ranging from 400 nm to 15 μm.

The oxide layer 40 may have a small thickness of about several tens of nm. However, when the thickness thereof is less than 400 nm, a slight color change may be exhibited due to interference. That is, a color with the oxide layer 40 may differ from the color without the oxide layer 40. The thickness thereof may be greater than or equal to 400 nm for the above reason, but may also be less than 400 nm as long as the color change is considered in designing. In general, when the thickness of the oxide layer 40 is greater than or equal to 400 nm, the color change is hardly exhibited.

Therefore, the thickness of the oxide layer 40 may be greater than or equal to 400 nm, and the upper limit of the thickness may vary depending on the economic feasibility of a method of coating the oxide layer 40. For example, when the oxide layer 40 is formed using sputtering, in consideration of an economical aspect, the thinner, the better. On the other hand, when the oxide layer 40 is formed using spraying, it is not easy to control the thickness to be less than or equal to several μm and thus, in this case, a thickness less than or equal to 15 μm may be suitable for process control. Therefore, the thickness of the oxide layer 40 may range from 400 nm to 15 μm.

Test examples of the present invention will now be described. However, the following test examples are merely for better understanding of the present invention, and the present invention is not limited thereto.

FIGS. 3 to 12 are images showing surface colors of metal members according to test examples of the present invention. Color changes of the metal members under various test example conditions will now be described.

Figure 3:
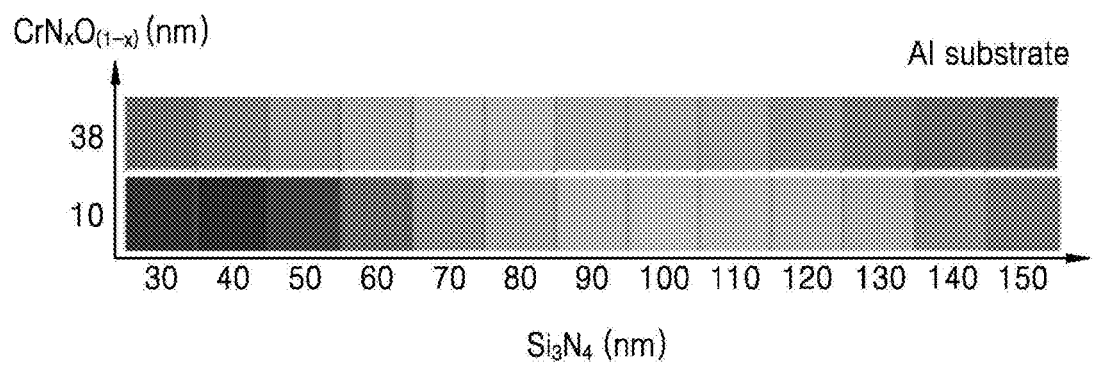
FIGS. 3 to 12 are images showing surface colors of metal members according to test examples of the present invention.
Figure 4:
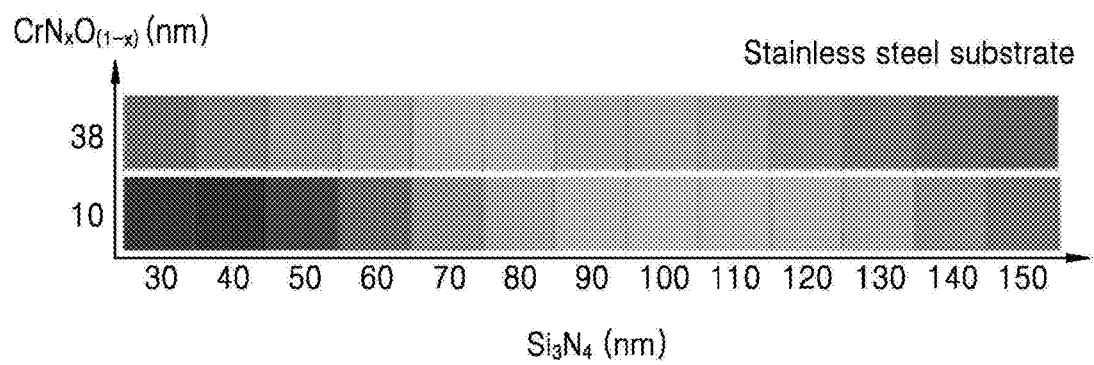
Figure 5:
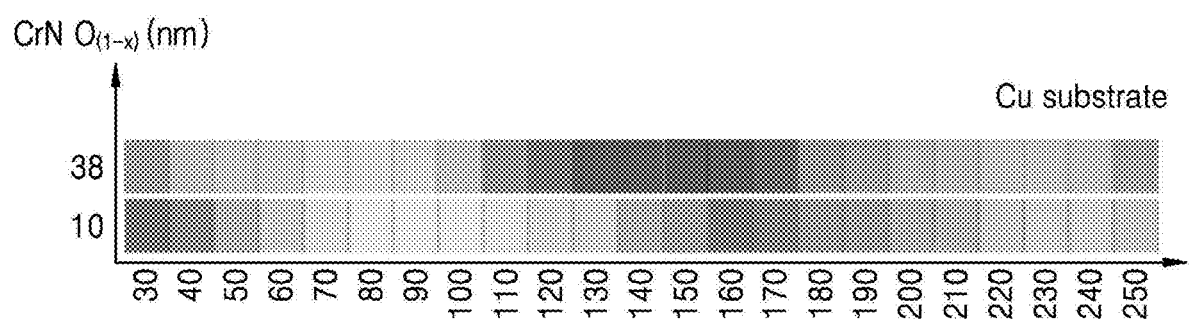

As a test example of the present invention, a $Si_3N_4$ dielectric layer was formed to have various thicknesses on an Al substrate, a stainless steel substrate, and a Cu substrate, a $CrN_xO_{(1-x)}$ layer (where x=0.83) having thicknesses of 10 nm and 38 nm was formed on the $Si_3N_4$ dielectric layer, and surface color changes of the substrates were observed as shown in FIGS. 3 to 5. Specifically, the $Si_3N_4$ dielectric layer was formed using plasma-enhanced chemical vapor deposition (PECVD). $SiH_4$, $NH_3$, and $N_2$ were used as reaction gases, and a deposition temperature was 250° C. The $CrN_xO_{(1-x)}$ layer was deposited using reactive sputtering. The value x in the $CrN_xO_{(1-x)}$ layer may be controlled by controlling nitrogen and oxygen in the sputtering gases.

Referring to FIGS. 3 to 5, when the $CrN_xO_{(1-x)}$ layer of x=0.83 is formed on the $Si_3N_4$ dielectric layer, the Al substrate, the stainless steel substrate, and the Cu substrate all exhibit vivid and various colors.

Figure 6:
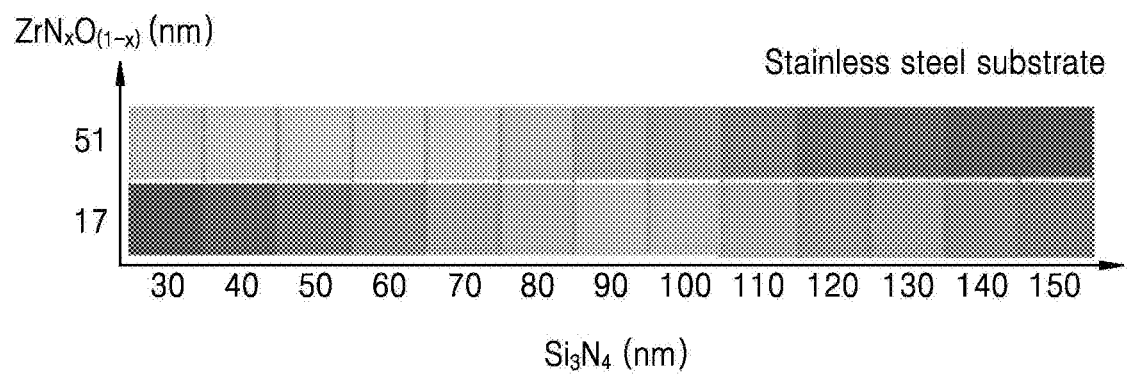
Figure 7:
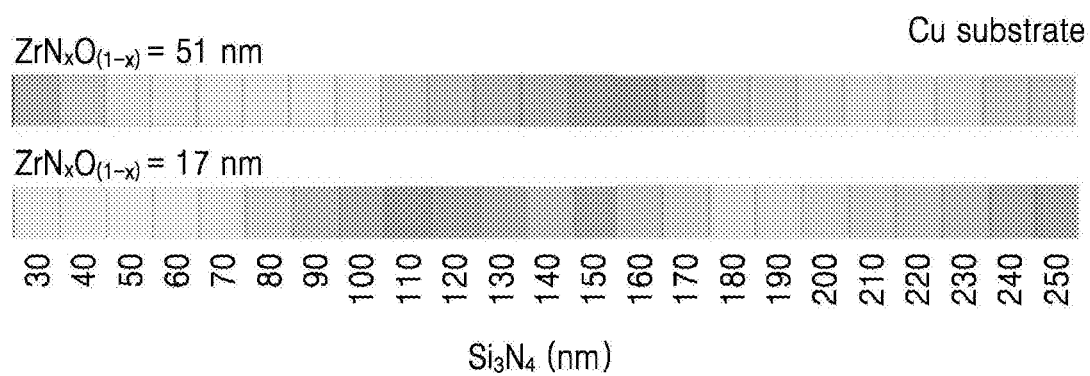

As another test example of the present invention, a $Si_3N_4$ dielectric layer was formed to have various thicknesses on a stainless steel substrate and a Cu substrate, and a $ZrN_xO_{(1-x)}$ layer (where x=0.63) having thicknesses of 17 nm and 51 nm was formed on the $Si_3N_4$ dielectric layer, and surface color changes of the substrates were observed as shown in FIGS. 6 and 7.

Figure 8:
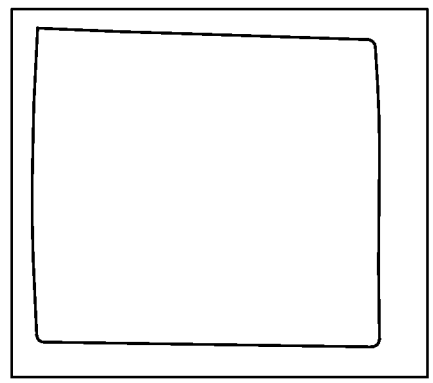
Figure 9:
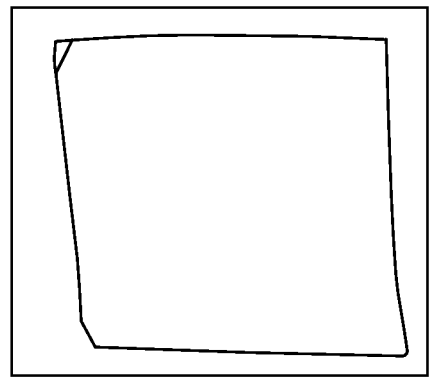

In addition, a $Si_3N_4$ dielectric layer having thicknesses of 240 nm and 250 nm was formed on a Cu substrate, a $ZrN_xO_{(1-x)}$ layer having a thickness of 51 nm was formed thereon, and a pencil hardness was measured as shown in FIGS. 8 and 9.

Referring to FIGS. 6 and 7, when the $ZrN_xO_{(1-x)}$ layer of x=0.63 is formed on the $Si_3N_4$ dielectric layer, the stainless steel substrate and the Cu substrate both exhibit vivid and various colors.

Referring to FIGS. 8 and 9, when the $ZrN_xO_{(1-x)}$ layer of x=0.63 is adopted, the metal member expresses a pink color, and is scratched at a pencil hardness of 9H but is not scratched at a pencil hardness of 8H to satisfy a very high durability.

Figure 10:
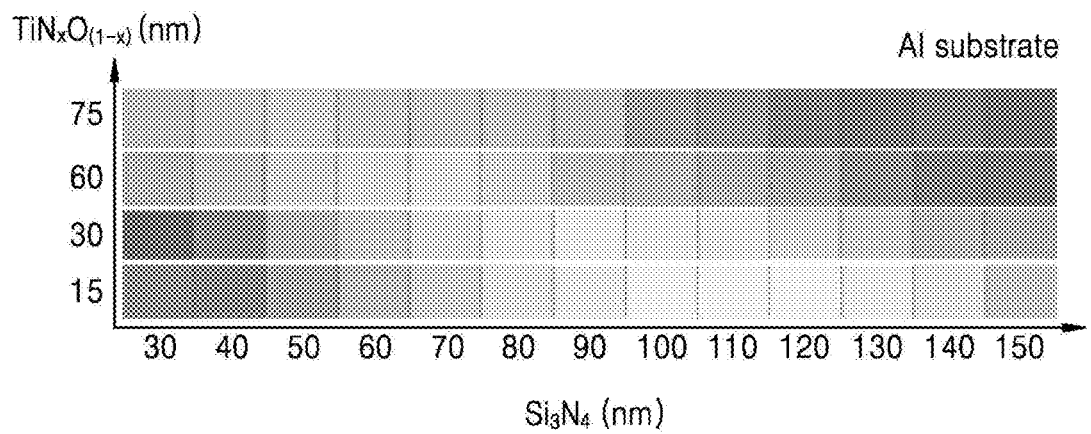
Figure 11:
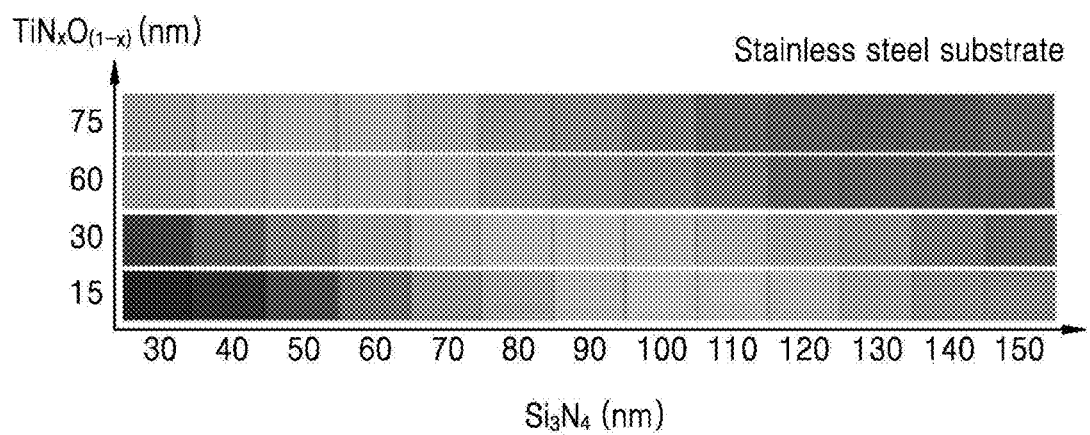
Figure 12:
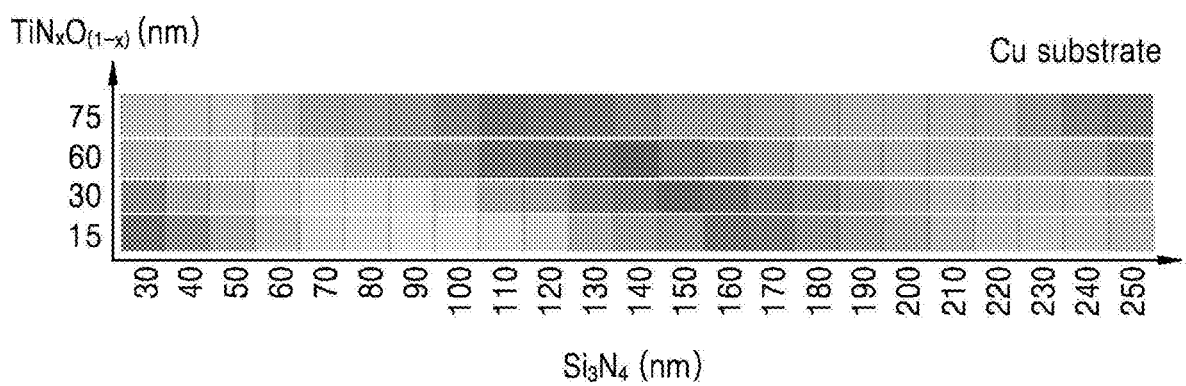

As still another test example of the present invention, a $Si_3N_4$ dielectric layer was formed to have various thicknesses on an Al substrate, a stainless steel substrate, and a Cu substrate, a $TiN_xO_{(1-x)}$ layer (where x=0.7) having thicknesses of 15 nm, 30 nm, 60 nm, and 75 nm was formed on the $Si_3N_4$ dielectric layer, and surface color changes of the substrates were observed as shown in FIGS. 10 to 12.

Referring to FIGS. 10 to 12, when the $TiN_xO_{(1-x)}$ layer of x=0.7 is formed on the $Si_3N_4$ dielectric layer, the Al substrate, the stainless steel substrate, and the Cu substrate all exhibit vivid and various colors. It is observed that various colors may be obtained when the thickness of the $TiN_xO_{(1-x)}$ layer is changed while the thickness of the $Si_3N_4$ dielectric layer is fixed.

As described above, by using an oxynitride compound layer instead of an upper metal layer of a MIM structure, vivid colors may be expressed on the surface of a metal substrate and a high-durability metal member may be produced. Various color changes may be induced based on the thickness and type of a dielectric layer and the type and thickness of the oxynitride compound layer, and a color to be used may be controlled at this time by the selection of a designer. The metal substrate may also be formed by coating a metal on the surface of a non-metallic substrate, e.g., ceramic, plastic, or vinyl. In this case, to exhibit metallic properties, the metal may have a thickness greater than or equal to 100 nm. The coated metal substrate may change the surface of the non-metallic substrate to various colors by using the above-described coloring method. A thin plastic substrate coated, on a surface, with a color coating layer formed using the above-described method, and coated, on the other surface, with an adhesive agent may also be used.

According to the above-described method of the present invention, a metal member having a high durability and capable of controlling the surface of the metal member to vivid and various colors may be provided. However, the scope of the present invention is not limited to the above-described effect.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A high-durability coloring metal member comprising:
a metal substrate;
a dielectric layer provided on the metal substrate; and
an oxynitride compound layer provided on the dielectric layer,
wherein contents of nitrogen and oxygen contained in the oxynitride compound layer are represented as atomic fractions, and a ratio of nitrogen to oxygen is greater than 1.

2. The high-durability coloring metal member of claim 1, wherein the oxynitride compound layer comprises $CrN_xO_{(1-x)}$, $TiN_xO_{(1-x)}$, $ZrN_xO_{(1-x)}$, $(Cr, Ti, Zr)N_xO_{(1-x)}$, or $(Ti, Al)N_xO_{(1-x)}$, where x is greater than 0.5.

3. The high-durability coloring metal member of claim 1, wherein the oxynitride compound layer has a thickness ranging from 5 nm to 100 nm.

4. The high-durability coloring metal member of claim 1, wherein the dielectric layer comprises $SiO_2$, $Al_2O_3$, MgO, $TiO_2$, $WO_3$, indium tin oxide (ITO), $Si_3N_4$, or AlN.

5. The high-durability coloring metal member of claim 1, wherein the dielectric layer has a thickness ranging from 30 nm to 400 nm.

6. The high-durability coloring metal member of claim 1, further comprising an oxide layer provided on the oxynitride compound layer.

7. The high-durability coloring metal member of claim 6, wherein the oxide layer comprises $SiO_2$ or $Al_2O_3$.

8. The high-durability coloring metal member of claim 6, wherein the oxide layer has a thickness ranging from 400 nm to 15 µm.

9. A method of producing a high-durability coloring metal member, the method comprising:
forming a dielectric layer on a metal substrate; and
forming an oxynitride compound layer on the dielectric layer,
wherein a ratio of nitrogen to oxygen contained in the oxynitride compound layer is greater than 1.

10. The method of claim 9, wherein the forming of the oxynitride compound layer is performed using any one selected from among physical vapor deposition (PVD), chemical vapor deposition (CVD), and atomic layer deposition (ALD).

11. The method of claim 9, wherein the oxynitride compound layer comprises $CrN_xO_{(1-x)}$, $TiN_xO_{(1-x)}$, $ZrN_xO_{(1-x)}$, $(Cr, Ti, Zr)N_xO_{(1-x)}$, or $(Ti, Al) N_xO_{(1-x)}$, where x is greater than 0.5.

12. The method of claim 9, wherein the oxynitride compound layer has a thickness ranging from 5 nm to 100 nm.

13. The method of claim 9, wherein the dielectric layer comprises $SiO_2$, $Al_2O_3$, MgO, $TiO_2$, $WO_3$, indium tin oxide (ITO), $Si_3N_4$, or AlN.

14. The method of claim 9, wherein the dielectric layer has a thickness ranging from 30 nm to 400 nm.

15. The method of claim 9, further comprising forming an oxide layer on the oxynitride compound layer.

16. The method of claim 15, wherein the oxide layer comprises $SiO_2$ or $Al_2O_3$.

17. The method of claim 15, wherein the oxide layer has a thickness ranging from 400 nm to 15 μm.

* * * * *